United States Patent
Neiger et al.

(10) Patent No.: US 7,840,962 B2
(45) Date of Patent: Nov. 23, 2010

(54) SYSTEM AND METHOD FOR CONTROLLING SWITCHING BETWEEN VMM AND VM USING ENABLING VALUE OF VMM TIMER INDICATOR AND VMM TIMER VALUE HAVING A SPECIFIED TIME

(75) Inventors: Gilbert Neiger, Portland, OR (US); Steven M. Bennett, Hillsboro, OR (US); Erik Cota-Robles, Portland, OR (US); Sebastian Schoenberg, Hillboro, OR (US); Clifford D. Hall, Orangevale, CA (US); Dion Rodgers, Hillsboro, OR (US); Lawrence O. Smith, Beaverton, OR (US); Andrew V. Anderson, Hillsboro, OR (US); Richard A. Uhlig, Hillsboro, OR (US); Michael Kozuch, Export, PA (US); Andy Glew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1474 days.

(21) Appl. No.: 10/956,239

(22) Filed: Sep. 30, 2004

(65) Prior Publication Data

US 2006/0075402 A1 Apr. 6, 2006

(51) Int. Cl.
*G06F 9/455* (2006.01)
*G06F 9/46* (2006.01)
*G06F 11/00* (2006.01)

(52) U.S. Cl. .................. 718/1; 718/100; 718/102; 718/104; 718/108; 714/2; 714/15; 714/34

(58) Field of Classification Search .............. 718/1, 718/100, 101, 102, 103, 104, 105, 108; 714/2, 714/8, 15, 34, 39, 48
See application file for complete search history.

(56) References Cited

U.S. PATENT DOCUMENTS 3,699,532 A 10/1972 Schaffer et al.

(Continued)

FOREIGN PATENT DOCUMENTS

DE 4217444 12/1992

(Continued)

OTHER PUBLICATIONS

Berg, Cliff, "How Do I Create a Signed Applet?", *Dr. Dobb's Journal*, (Aug. 1997),1-9.
Brands, Stefan, "Restrictive Blinding of Secret-Key Certificates", *Springer-Verlag* XP002201306, (1995),Chapter 3.
Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999),209-221.

(Continued)

*Primary Examiner*—Li B Zhen
*Assistant Examiner*—Abdullah Al Kawsar
(74) *Attorney, Agent, or Firm*—Blakely, Sokoloff, Taylor & Zafman LLP (57) ABSTRACT

In one embodiment, a method includes transitioning control to a virtual machine (VM) from a virtual machine monitor (VMM), determining that a VMM timer indicator is set to an enabling value, and identifying a VMM timer value configured by the VMM. The method further includes periodically comparing a current value of a timing source with the VMM timer value, generating an internal event if the current value of the timing source has reached the VMM timer value, and transitioning control to the VMM in response to the internal event without incurring an event handling procedure in any one of the VMM and the VM.

18 Claims, 5 Drawing Sheets

U.S. PATENT DOCUMENTS

| | | |
|---|---|---|
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,400,769 A * | 8/1983 | Kaneda et al. ............... 710/267 |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |
| 4,811,276 A * | 3/1989 | Suga ........................... 714/34 |
| 4,825,052 A | 4/1989 | Chemin et al. |
| 4,907,270 A | 3/1990 | Hazard |
| 4,907,272 A | 3/1990 | Hazard |
| 4,910,774 A | 3/1990 | Barakat |
| 4,974,159 A * | 11/1990 | Hargrove et al. ............... 703/27 |
| 4,975,836 A | 12/1990 | Hirosawa et al. |
| 5,007,082 A | 4/1991 | Cummins |
| 5,022,077 A | 6/1991 | Bealkowski et al. |
| 5,023,771 A * | 6/1991 | Kishi .......................... 710/260 |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,237,669 A | 8/1993 | Spear et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A * | 4/1996 | Nakajima et al. ........... 718/100 |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A * | 5/1999 | Dingwall et al. ............ 718/103 |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,128,318 A * | 10/2000 | Sato ........................... 370/503 |
| 6,131,166 A | 10/2000 | Wong-Isley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |

| | | |
|---|---|---|
| 6,212,635 B1 | 4/2001 | Reardon |
| 6,222,923 B1 | 4/2001 | Schwenk |
| 6,230,118 B1 * | 5/2001 | Bader et al. .................. 703/24 |
| 6,249,872 B1 | 6/2001 | Wildgrube et al. |
| 6,252,650 B1 | 6/2001 | Nakaumra |
| 6,269,392 B1 | 7/2001 | Cotichini et al. |
| 6,272,533 B1 | 8/2001 | Browne et al. |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,401,156 B1 | 6/2002 | Mergard et al. |
| 6,412,035 B1 | 6/2002 | Webber |
| 6,421,702 B1 * | 7/2002 | Gulick ........................ 718/102 |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,496,847 B1 | 12/2002 | Bugnion et al. |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,795,966 B1 | 9/2004 | Lim et al. |
| 7,177,967 B2 * | 2/2007 | Jeyasingh et al. ........... 710/260 |
| 7,356,817 B1 * | 4/2008 | Cota-Robles et al. .......... 718/1 |
| 7,370,324 B2 * | 5/2008 | Goud et al. ..................... 718/1 |
| 7,421,533 B2 * | 9/2008 | Zimmer et al. ................ 711/6 |
| 7,475,002 B1 * | 1/2009 | Mann .......................... 703/23 |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0037089 A1 * | 2/2003 | Cota-Robles et al. .......... 709/1 |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0003323 A1 * | 1/2004 | Bennett et al. ................ 714/36 |
| 2004/0003324 A1 * | 1/2004 | Uhlig et al. ................... 714/38 |
| 2004/0117532 A1 * | 6/2004 | Bennett et al. .............. 710/260 |
| 2004/0117539 A1 * | 6/2004 | Bennett et al. ................. 711/6 |
| 2005/0132362 A1 * | 6/2005 | Knauerhase et al. ........... 718/1 |
| 2005/0149933 A1 * | 7/2005 | Saito et al. .................. 718/100 |
| 2005/0251806 A1 * | 11/2005 | Auslander et al. ........... 718/100 |
| 2006/0130059 A1 * | 6/2006 | Bennett et al. ................. 718/1 |
| 2009/0025006 A1 * | 1/2009 | Waldspurger ............... 718/104 |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| JP | 2000076139 | 3/2000 |
| JP | 2001282558 | 10/2001 |
| RU | 2159467 | 11/2000 |
| RU | 2159953 | 11/2000 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO9957863 | 11/1999 |
| WO | WO9965579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175564 | 10/2001 |
| WO | WO0175565 | 10/2001 |
| WO | WO0175595 | 10/2001 |
| WO | WO0201794 | 1/2002 |
| WO | WO0217555 | 2/2002 |
| WO | WO02060121 | 8/2002 |
| WO | WO02086684 | 10/2002 |
| WO | WO03058412 | 7/2003 |

OTHER PUBLICATIONS

Compaq Computer Corporation, "Trusted Computing Platform Alliance (TCPA) Main Specification Version 1.1a", XP002272822, (Jan. 25, 2001),pp. 123-227.

Coulouris, George, et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986),155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Fabry, R.S., "Capability-Based Addressing", Fabry, R.S., "*Capability-Based Addressing,*" *Communications of the ACM*, vol. 17, No. 7, (Jul. 1974),403-412.

Frieder, Gideon, "The Architecture and Operational Characteristics of the VMX Host Machine", *The Architecture and Operational Characteristics of the VMX Host Machine, IEEE*, (1982),9-16.

Goldberg, Robert P., "Survey of Virtual Machine Research", *Computer Magazine*, (Jun. 1974),34-35.

Gong, Li, et al., "Going Beyond the Sandbox: An Overview of the New Security Architecture in the Java Development Kit 1.2", *Proceedings of the USENIX Symposium on Internet Technologies and Systems*, Monterey, CA,(Dec. 1997).

Gum, P. H., "System/370 Extended Architecture: Facilities for Virtual Machines", *IBM J. Research Development*, vol. 27, No. 6, (Nov. 1983),530-544.

Heinrich, Joe, "MIPS R4000 Microprocessor User's Manual, Second Edition", *Chapter 4 "Memory Management"*, (Jun. 11, 1993),61-79.

HP Mobile Security Overview, "HP Mobile Security Overview", (Sep. 2002),1-10.

IBM, "Information Display Technique for a Terminate Stay Resident Program IBM Technical Disclosure Bulletin", *TDB-ACC-No. NA9112156*, vol. 34, Issue 7A,(Dec. 1, 1991),156-158.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel, "IA-32 Intel Architecture Software Developer's Manual", vol. 3: *System Programming Guide*, Intel Corporation—2003,13-1 through 13-24.

Intel, "Intel386 DX Microprocessor 32-Bit CHMOS Microprocessor With Integrated Memory Management", (1995),5-56.

Intel Corporation, "IA-64 System Abstraction Layer Specification", *Intel Product Specification*, Order No. 245359-001, (Jan. 2000),1-112.

Intel Corporation, "Intel 82802AB/82802AC Firmware Hub (FWH)", *Intel Product Datasheet*, Document No. 290658-004,(Nov. 2000),1-6, 17-28.

Intel Corporation, "Intel IA-64 Architecture Software Developer's Manual", vol. 2: *IA-64 System Architecture*, Order No. 245318-001, (Jan. 2000),i, ii, 5.1-5.3, 11.1-11.8, 11.23-11.26.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996), pp. 278-287.

Lawton, Kevin, et al., "Running Multiple Operating Systems Concurrently on an IA32 PC Using Virtualization Techniques", http://www.plex86.org/research/paper.txt, (Nov. 29, 1999),1-31.

Luke, Jahn, et al., "Replacement Strategy for Aging Avionics Computers", *IEEE AES Systems Magazine*, XP002190614,(Mar. 1999), pp. 7-11.

Menezes, Alfred J., et al., "Handbook of Applied Cryptography", *CRC Press Series on Discrete Mathematices and its Applications*, Boca Raton, FL, XP002165287, ISBN 0849385237,(Oct. 1996),403-405, 506-515, 570.

Menezes, Alfred J., et al., "Handbook of Applied Cryptography", *CRC Press LLC*, USA XP002201307, (1997),475.

Motorola, "M68040 User's Manual", (1993),1-1 to 8-32.

Nanba, S., et al., "VM/4: ACOS-4 Virtual Machine Architecture", *VM/4: ACOS-4 Virtual Machine Architecture, IEEE*,(1985),171-178.

Richt, Stefan, et al., "In-Circuit-Emulator Wird Echtzeittauglich", *Elektronic, Franzis Verlag GMBH*, Munchen, DE, vol. 40, No. 16, XP000259620,(100-103),Aug. 6, 1991, pp. 1-4.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M., "Virtual Platform: A Virtual Machine Monitor for Commodity PC", *Proceedings of the 11th Hotchips Conference*, (Aug. 17, 1999),185-196.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio, et al., "A Hardware Scheduler for Complex Real-Time Systems", *Proceedings of the IEEE International Symposium on Industrial Electronics*, XP002190615,(Jul. 1999),43-48.

Schneier, Bruce, "Applied Cryptography: Protocols, Algorithm, and Source Code in C", *Wiley, John & Sons, Inc.*, XP002939871; ISBN 0471117099,(Oct. 1995),47-52.

Schneier, Bruce, "Applied Cryptography: Protocols, Algorithm, and Source Code in C", *Wiley, John & Sons, Inc.*, XP002138607; ISBN 0471117099,(Oct. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C",*2nd Edition; Wiley, John & Sons, Inc.*, XP002251738; ISBN 0471128457,(Nov. 1995),28-33; 176-177; 216-217; 461-473; 518-522.

Sherwood, Timothy, et al., "Patchable Instruction ROM Architecture", *Department of Computer Science and Engineering*, University of California, San Diego, La Jolla, CA, (Nov. 2001), pp. 24-33.

PCT Search Report mailed Mar. 10, 2006, 6 pages.

Hall, Judith S., et al., "Virtualizing the VAX Architecture," ACM SIGARCH Computer Architecture News, Proceedings of the 18th annual international symposium on Computer architecture, vol. 19, Issue No. 3, Apr. 1991, 10 pages.

Written Opinion of the International Searching Authority from foreign counterpart PCT Patent Application No. PCT/US2005/034146, mailed Apr. 4, 2007, 6 pages.

First Office Action from foreign counterpart China Patent Application No. 200580032344.X, mailed Mar. 21, 2008, 18 pages (Translation included).

Second Office Action from foreign counterpart China Patent Application No. 200580032344.X, mailed Sep. 19, 2008, 9 pages (Translation included).

Decision of Refusal from foreign counterpart German Patent Application No. 11 2005 002 360.5-53, mailed Jan. 25, 2010, 13 pages (Translation included).

Office Action from foreign counterpart German Patent Application No. 11 2005 002 360.5-53, mailed Jan. 26, 2010, 7 pages (Translation included).

First Office Action from foreign counterpart German Patent Application No. 11 2005 002 360.5-53, mailed Jun. 19, 2008, 7 pages (Translation included).

The Minutes of the Hearing from foreign counterpart German Patent Application No. 11 2005 002 360.5-53, mailed May 27, 2009, 6 pages (Translation included).

Office Action from foreign counterpart Japan Patent Application No. 2007-533650, mailed Jul. 7, 2009, 5 pages (Translation included).

Office Action from foreign counterpart Japan Patent Application No. 2007-533650, mailed Dec. 8, 2009, 3 pages (Translation included).

Trusted Computing Platform Alliance (TCPA), Main Specification Version 1.1b, Published by the Trusted Computing Group, 2003, 332 pages.

Rozycki, Macieg W. Protected Mode Virtual Interrupts (PVI) on Pentium and SL-enhanced i486 Intel processors. 1996, Retrieved from the Internet: <URL:http://www.rcollins.org/articles/pvi1/pvi1.html>.

Walker, Wade and Cragon, Harvey. Interrupt Processing in Concurrent Processors. Jun. 1995. Computer. pp. 36-46.

Collins, Robert R. Details on Intel's Virtual Mode Extensions (VME). Mar. 1998. Retrieved from the Internet: <URL:http://rcollins.org/ddj/Mar98/Mar98.html>.

* cited by examiner

SYSTEM AND METHOD FOR CONTROLLING SWITCHING BETWEEN VMM AND VM USING ENABLING VALUE OF VMM TIMER INDICATOR AND VMM TIMER VALUE HAVING A SPECIFIED TIME

FIELD

Embodiments of the invention relate generally to virtual machines, and more specifically to providing support for a timer associated with a virtual machine monitor.

BACKGROUND

Timers and time reference sources are typically used by operating systems and application software to schedule and optimize activities. For example, an operating system kernel may use a timer to allow a plurality of user-level applications to time-share the resources of the system (e.g., the central processing unit (CPU)). An example of a timer used on a personal computer (PC) platform is the 8254 Programmable Interval Timer. This timer may be configured to issue interrupts after a specified interval or periodically.

An example of a time reference source is the timestamp counter (TSC) used in the instruction set architecture (ISA) of the Intel® Pentium® 4 (referred to herein as the IA-32 ISA). The TSC is a 64-bit counter that is set to 0 following the hardware reset of the processor, and then incremented every processor clock cycle, even when the processor is halted by the HLT instruction. The TSC cannot be used to generate interrupts. It is a time reference only, useful to measure time intervals. The IA-32 ISA provides an instruction (RDTSC) to read the value of the TSC and an instruction (WRMSR) to write the TSC. When WRMSR is used to write the timestamp counter, only the 32 low-order bits may be written; the 32 high-order bits are cleared to 0.

In a virtual machine system, a virtual-machine monitor (VMM) may need to utilize platform-based timers in a manner similar to that of a conventional operating system. For example, a VMM may use timers to schedule resources, assure security, provide quality of service, etc.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

A method and apparatus for providing support for a timer associated with a virtual machine monitor is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe providing support to a timer associated with a virtual machine monitor (VMM) in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Figure 1:
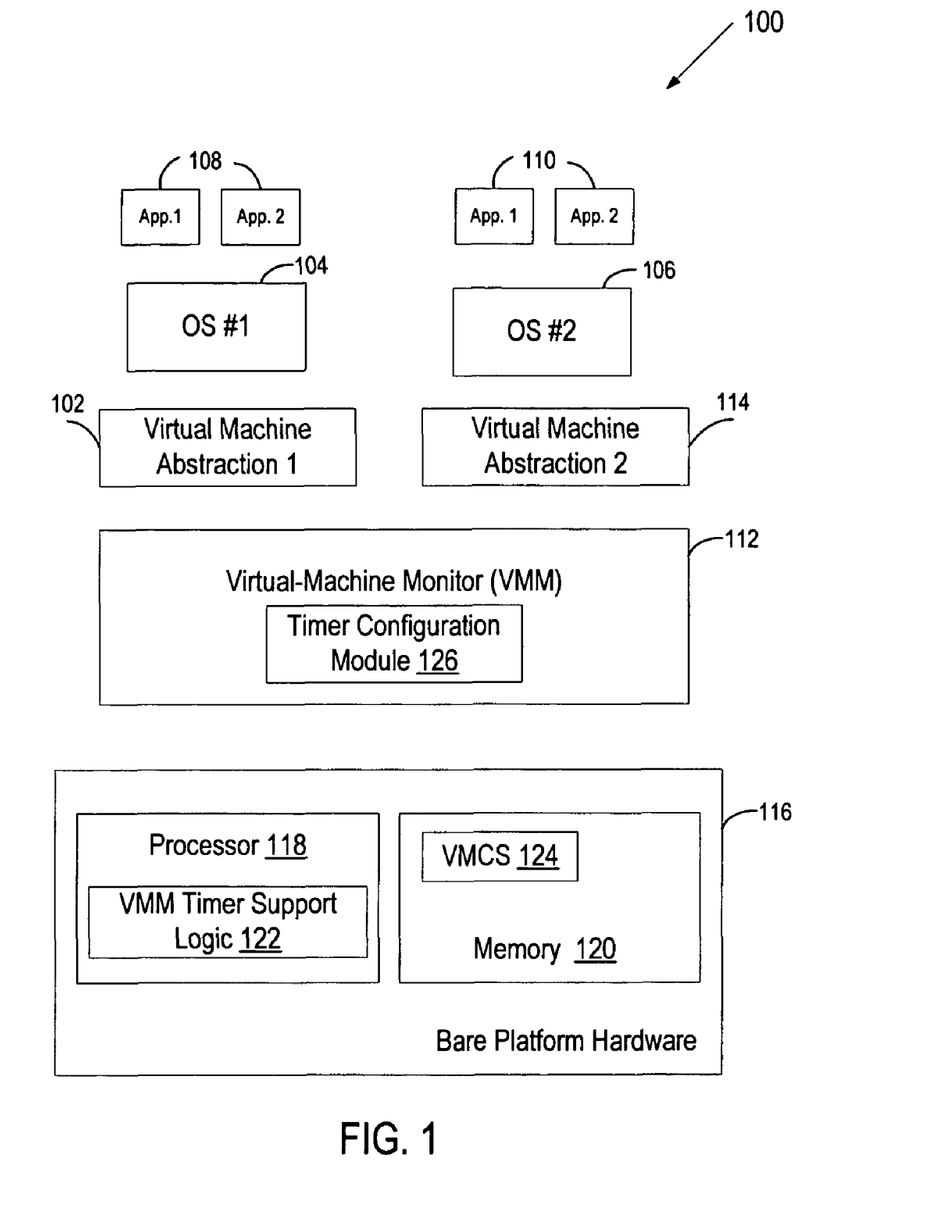
FIG. 1 illustrates one embodiment of a virtual-machine environment, in which the present invention may operate.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112.

The VMM 112, though typically implemented in software, may emulate and export a bare machine interface to higher level software. Such higher level software may comprise a standard or real-time OS, may be a highly stripped down operating environment with limited operating system functionality, may not include traditional OS facilities, etc. Alternatively, for example, the VMM 112 may be run within, or on top of, another VMM. VMMs may be implemented, for example, in hardware, software, firmware or by a combination of various techniques.

The platform hardware 116 can be of a personal computer (PC), mainframe, handheld device, portable computer, set-top box, or any other computing system. The platform hardware 116 includes a processor 118 and memory 120.

Processor 118 can be any type of processor capable of executing software, such as a microprocessor, digital signal processor, microcontroller, or the like. The processor 118 may include microcode, programmable logic or hardcoded logic for performing the execution of method embodiments of the present invention. Although FIG. 1 shows only one such processor 118, there may be one or more processors in the system.

Memory 120 can be a hard disk, a floppy disk, random access memory (RAM), read only memory (ROM), flash memory, any combination of the above devices, or any other type of machine medium readable by processor 118. Memory 120 may store instructions and/or data for performing the execution of method embodiments of the present invention.

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108 and 110. Each of the guest OSs 104 and 106 expects to access physical resources (e.g., processor registers, memory and I/O devices) within the VMs 102 and 114 on which the guest OS 104 or 106 is running and to perform other functions. For example, the guest OS 104 or 106 expects to have access to all registers, caches, structures, I/O devices, memory and the like, according to the architecture of the processor and platform presented in the VM 102 and 114. The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed by guest software.

Further, each guest OS expects to handle various fault events such as exceptions (e.g., page faults, general protection faults, etc.), interrupts (e.g., hardware interrupts, software interrupts), and platform events (e.g., initialization (NIT) and system management interrupts (SMIs)). Some of these fault events are "privileged" because they must be handled by the VMM 112 to ensure proper operation of VMs 102 and 114 and for protection from and among guest software.

When a privileged fault event occurs or guest software attempts to access a privileged resource, control may be transferred to the VMM 112. The transfer of control from guest software to the VMM 112 is referred to herein as a VM exit. After facilitating the resource access or handling the event appropriately, the VMM 112 may return control to guest software. The transfer of control from the VMM 112 to guest software is referred to as a VM entry.

In one embodiment, the processor 118 controls the operation of the VMs 102 and 114 in accordance with data stored in a virtual machine control structure (VMCS) 124. The VMCS 124 is a structure that may contain the state of guest software, the state of the VMM 112, execution control information indicating how the VMM 112 wishes to control operation of guest software, information controlling transitions between the VMM 112 and a VM, etc. The processor 118 reads information from the VMCS 124 to determine the execution environment of the VM and to constrain its behavior. In one embodiment, the VMCS is stored in memory 120. In some embodiments, multiple VMCS structures are used to support multiple VMs.

In one embodiment, when a VM exit occurs, components of the processor state used by guest software are saved, components of the processor state required by the VMM 112 are loaded, and the execution resumes in the VMM 112. In one embodiment, the components of the processor state used by guest software are stored in a guest-state area of VMCS 124 and the components of the processor state required by the VMM 112 are stored in a monitor-state area of VMCS 124. In one embodiment, when a transition from the VMM 112 to guest software occurs, the processor state that was saved at the VM exit (and may have been modified by the VMM 112 while processing the VM exit) is restored and control is returned to the VM 102 or 114.

An event causing a VM exit may or may not require the execution of an "event handling" procedure. The event handling procedure refers to event reporting that changes control flow of the code executing on the processor even though no branches requiring such a change exist in the code. Event reporting is typically performed when an event is an exception or an interrupt and may require saving the state of the running code (e.g., on a stack), locating an interrupt vector by traversing a redirection structure (e.g., the interrupt descriptor table (IDT) in the instruction set architecture (ISA) of the Intel® Pentium® 4 (referred to herein as the IA-32 ISA)), loading the state of the event handler, and starting execution in the new code. When an exception or interrupt occurs during the operation of the VM 102 or 114, and this exception or interrupt should be handled by the VMM 112 (e.g., an I/O completion interrupt for an I/O operation that was not initiated by or on behalf of the running VM 102 or 114), the event handling procedure is executed after exiting the running VM 102 or 114 (i.e., transitioning control to the VMM 112).

Some events do not require the above-referenced event handling procedure to be executed in either the VMM 112 or the VM 102 or 114. Such events are referred to herein as internal events. For example, the VM 102 or 114 may incur a page fault on a page, which the VMM 112 has paged out but the VM 102 or 114 expects to be resident. Such a page fault cannot cause the event handling procedure, in order to prevent a violation of virtualization. Instead, this page fault is handled using a VM exit, which causes the VM state to be saved in the VMCS 124, with the execution resuming in the VMM 112, which handles the page fault and transitions control back to the VM 102 or 114.

The VMM 112 may need to gain control during the operation of the VM 102 or 114 to schedule resources, provide quality of service, assure security, and perform other functions. Hence, the VMM 112 needs to have a timer mechanism allowing the VMM 112 to indicate the desired time for gaining control. In one embodiment, the VMM 112 includes a timer configuration module 126 that provides values for fields associated with the VMM timer prior to requesting a transition of control to the VM 102 or 114. These fields may include, for example, a VMM timer indicator specifying whether a VMM timer should be enabled, and a VMM timer value field indicating a desired time for regaining control.

In one embodiment, the VMM timer indicator and the VMM timer value are stored in the VMCS 124. Alternatively, the VMM timer indicator and the VMM timer value may reside in the processor 118, a combination of the memory 120 and the processor 118, or in any other storage location or locations. In one embodiment, a separate pair of the VMM timer indicator and VMM timer value is maintained for each of the VMs 102 and 114. Alternatively, the same VMM timer indicator and VMM timer value are maintained for both VMs 102 and 144 and are updated by the VMM 112 before each VM entry.

In one embodiment, in which the system 100 includes multiple processors or multi-threaded processors, each of the logical processors is associated with a separate pair of the VMM timer indicator and VMM timer value, and the VMM 112 configures the VMM timer indicator and VMM timer value for each of the logical processors.

In one embodiment, the processor 118 includes VMM timer support logic 122 that is responsible for determining whether the VMM timer is enabled based on the VMM timer indicator. If the VMM timer is enabled, the VMM timer support logic 122 decides when to transition control to the VMM 112 using the VMM timer value specified by the VMM 112.

In one embodiment, the VMM timer value specifies the time at which control should be returned to the VMM 112. During the operation of the VM 102 or 114, the VMM timer support logic 122 periodically (e.g., after each cycle executed by the currently operating VM 102 or 114) compares the current value of the timing source with the VMM timer value specified by the VMM 112. The timing source may be any clock used by the system 100 to measure time intervals. For example, in the IA-32 ISA, the timing source used for measuring time intervals may be the timestamp counter (TSC).

When the current time provided by the timing source "reaches" the VMM timer value specified by the VMM 112, the VMM timer support logic 122 transitions control to the VMM 112, indicating that the cause of the transition is the VMM timer. The current time "reaches" the VMM timer value if the current time matches the VMM timer value or exceeds the timer value (when an exact match between the current time and the VMM timer value is not possible).

In another embodiment, the VMM timer value specifies the time interval at the end of which the VMM 112 should gain control. During the operation of the VM 102 or 114, the VMM timer support logic 122 uses this time interval as a countdown value, periodically decrementing it (e.g., every N ticks of the clock). When the countdown value reaches zero, the VMM timer support logic 122 transitions control to the VMM 112. In one embodiment, if a VM exit occurs prior to the expiration of the countdown value (e.g. due to a fault detected during the operation of the VM), the VMM timer support logic 122 stores a current countdown value to the VMCS 124. The stored countdown value may replace the VMM timer value previously specified by the VMM 112 or be maintained in a designated countdown value field.

Figure 2:
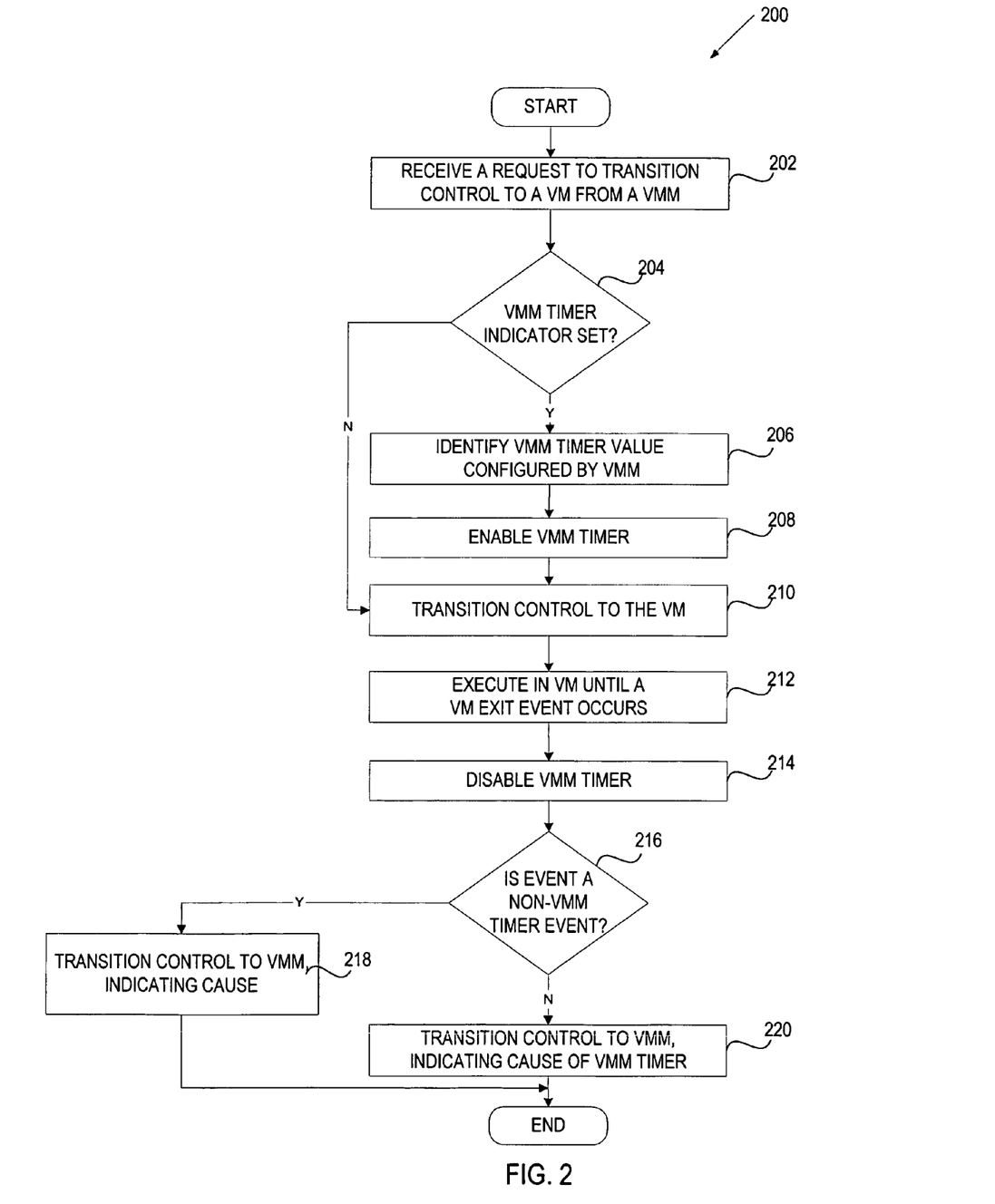
FIG. 2 is a flow diagram of one embodiment of a process for providing support for a timer associated with a VMM.

FIG. 2 is a flow diagram of one embodiment of a process 200 for providing support for a timer associated with a VMM. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 200 is performed by VMM timer support logic 122 of FIG. 1.

Referring to FIG. 2, process 200 begins with processing logic receiving a request to transition control to a VM from a VMM (i.e., the request for VM entry) (processing block 202). In one embodiment, the VM entry request is received via a VM entry instruction executed by the VMM.

Next, processing logic determines whether a VMM timer indicator is set to an enabling value (processing box 204). The VMM timer indicator is configured by the VMM and may be set to the enabling value to indicate that the VMM timer mechanism is enabled. As discussed above, the VMM timer mechanism (also referred to herein as the VMM timer) allows the VMM to gain control at a specific point of time during the operation of the VM.

If the determination made at processing box 204 is negative (the VMM timer indicator is set to a disabling value), processing logic proceeds to processing box 210.

If the determination made at processing box 204 is positive, processing logic identifies a VMM timer value configured by the VMM (processing block 206). In one embodiment, processing logic identifies the VMM timer value by retrieving it from the VMCS. The VMM stores the VMM timer value to the VMCS prior to issuing a VM entry request. At processing block 208, processing logic configures and enables the VMM timer using the VMM timer value.

In one embodiment, the VMM timer value specifies the time at which control should be returned to the VMM. The VMM may calculate this timer value by adding an offset value (i.e., a time interval specifying how long the VM is allowed to execute) to the value of the timing source read by the VMM at the time of calculation. In another embodiment, the VMM timer value is an offset time interval specifying how long the VM is allowed to execute.

Next, processing logic transitions control to the VM (processing block 210) and allows the VM to execute until an event associated with a VM exit occurs (processing block 212). In one embodiment, an event is associated with a VM exit if an execution control indicator associated with this event is set to a VM exit value to cause a VM exit for this event.

At processing block 214, the VMM timer is disabled. Note that if the VMM timer was not enabled in processing box 208, this processing step is not required. Next, if the event is a non-VMM timer event (e.g., a fault) associated with a VM exit (processing block 216), processing logic returns control to the VMM, indicating the cause of the VM exit (processing block 218).

Alternatively, if the event is caused by the VMM timer (processing block 216), processing logic transitions control to the VMM, indicating that the VM exist was caused by the VMM timer (processing block 220).

The VMM timer will generate events to trigger a VM exit based on the VMM timer value specified by the VMM. In one embodiment, in which the VMM timer value specifies the time at which the VMM desires to gain control, processing logic makes the above decision by periodically comparing the current time of the clock (e.g., the TSC, or some other timing reference) with the VMM timer value until detecting that the clock reaches the VMM timer value. In another embodiment, in which the VMM timer value is an offset time value specifying how long the VM is allowed to execute, processing logic makes the above decision by periodically decrementing the offset time value until detecting that the offset time value reaches 0.

It should be noted that FIG. 2 illustrates an embodiment in which VM exits caused by non-VMM timer events may have higher priority than VM exits caused by the VMM timer. However, this prioritization may be different depending on a prioritization scheme being used, and, therefore, a decision pertaining to a VM exit caused by a non-VMM timer event can be made after a decision pertaining to a VM exit caused by the VMM timer (processing block 214). Additionally, some non-VMM timer events may have higher priority while other non-VMM timer events may have lower priority than the VMM timer event.

Figure 3:
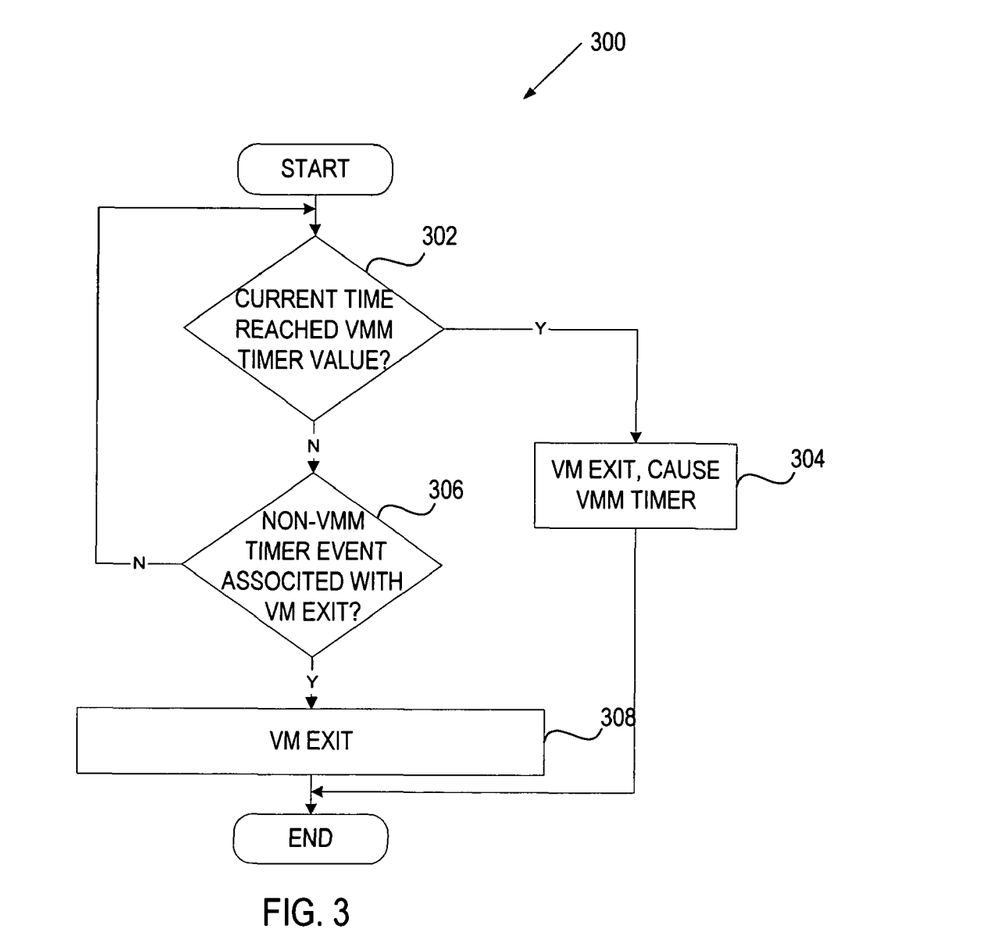
FIGS. 3 and 4 are flow diagrams of two embodiment of a process for utilizing a VMM timer to decide whether to return control to a VMM.
Figure 4:
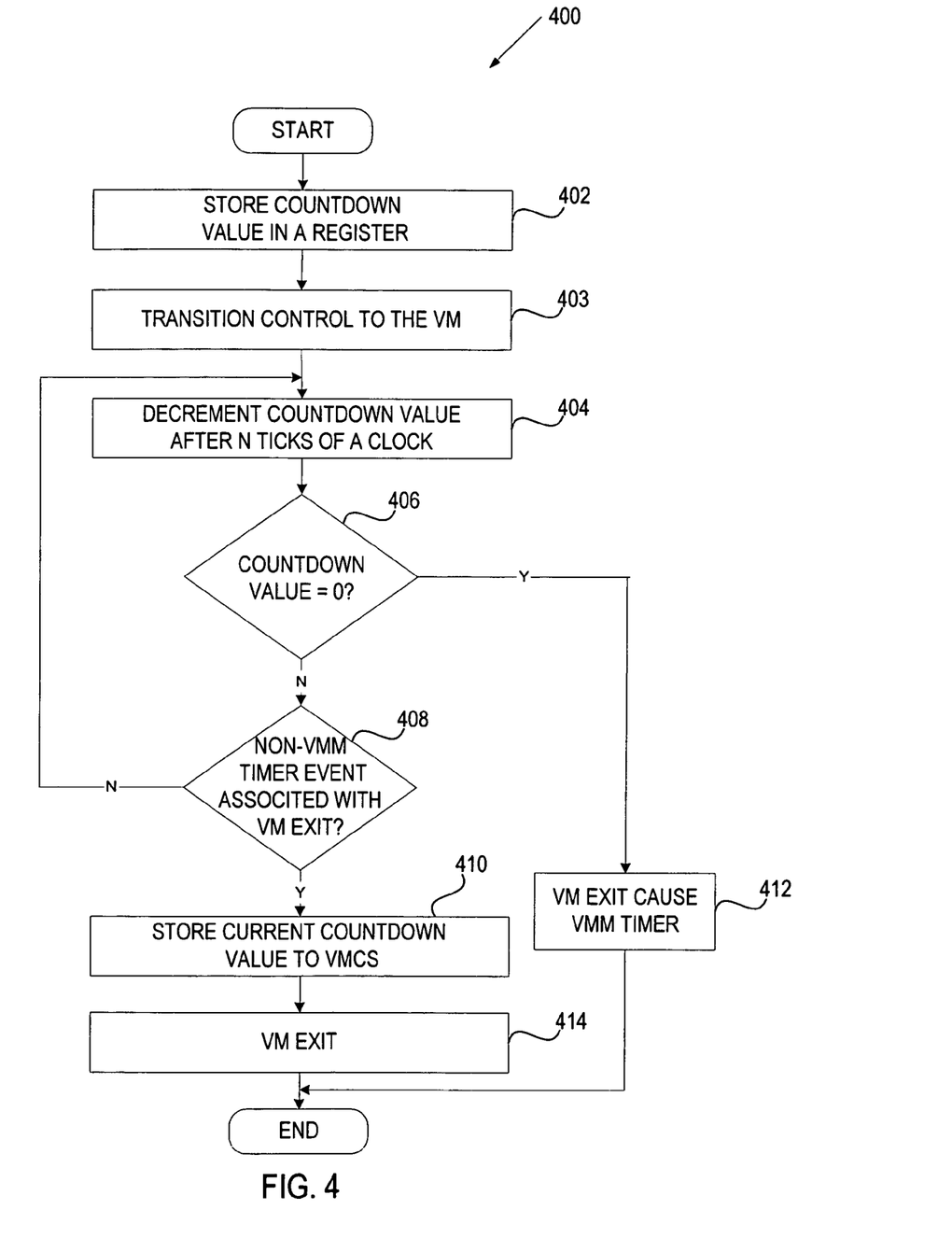

FIGS. 3 and 4 are flow diagrams of two embodiment of a process for utilizing a VMM timer to decide whether to return control to a VMM. The process may be performed by processing logic that may comprise hardware (e.g., circuitry, dedicated logic, programmable logic, microcode, etc.), software (such as that run on a general purpose computer system or a dedicated machine), or a combination of both. In one embodiment, the process is performed by VMM timer support logic 122 of FIG. 1.

Referring to FIG. 3, process 300 uses a VMM timer value that specifies the time at which control should be returned to the VMM. As discussed above, the VMM may calculate this timer value by adding an offset value (i.e., a time interval specifying how long the VM is allowed to execute) to the value of the timing source read by the VMM at the time of calculation.

Process 300 begins subsequent to determining that the VMM timer is enabled, identifying a VMM timer value configured by the VMM, and transitioning control to the VM, as illustrated in FIG. 2.

Initially, processing logic determines, during the operation of the VM, whether the current time provided by the timing source has reached the VMM timer value (processing box 302). As discussed above, the timing source may be any clock used by the system 100 to measure time intervals. For example, a processor supporting the IA-32 ISA may use the TSC to measure time intervals.

In an embodiment, not all of the bits in the timing source may be compared to the VMM timer value. Instead, only the high-order bits may be compared. The number of the bits compared is referred to as the VMM-timer-comparator length. In an embodiment, the VMM may determine the VMM-timer-comparator length by reading a capability model specific register (MSR) using the RDMSR instruction. In one embodiment, in which the TSC is used as the timing source, the determination of processing block 302 is made by comparing the high-order bits of the TSC with the same high-order bits of the VMM timer value, and if the TSC value is greater than or equal to the VMM timer value, then the comparison in processing block 302 is satisfied.

If the current time of the timing source reaches the VMM timer value, processing logic creates an internal event and generates a VM exit, indicating that the cause of the VM exit is due to the VMM timer (processing block 304). As discussed above, because the VM exit is caused by an internal event, the execution will resume in the VMM without performing the event handling procedure that is typically performed for interrupts or exceptions after exiting the VM.

If the current time of the timing source has not yet reached the VMM timer value, processing logic checks for a non-VMM timer event associated with a VM exit (processing box 306). If such event occurs, processing logic generates a VM exit and indicates the source of the VM exit (processing block 308). Otherwise, processing logic returns to processing block 302. Depending on the nature of the non-VMM timer event (e.g., whether the non-VMM timer event is an external interrupt or an internal event), exiting the VM may or may not be followed by the event handling procedure.

In one embodiment, the comparison between the current time and the VMM timer value (illustrated in processing box 302) is performed after each cycle executed by the VM, until the current time meets or exceeds the VMM timer value.

In an embodiment, the comparison is performed in a hardware component, which is configured to generate a signal if the current time matches the VMM timer value. The signal indicates that a VM exit should be generated due to the VMM timer. In one embodiment, the signal is recognized (e.g., by microcode or another hardware component) at the end of the currently executing instruction. The recognized signal indicates that a VM exit due to the VMM timer may be required. This requirement is then prioritized (e.g., by microcode or another hardware component) with other VM exit sources, and the appropriate VM exit to the VMM is generated. That is, if the VMM timer source is of higher priority than other VM exit sources, a VM exit due to the VMM timer is generated. If a VM exit source other than the VMM timer is of higher priority than the VMM timer, a VM exit due to this other source is generated.

Referring to FIG. 4, process 400 uses a VMM timer value that specifies an offset value indicating how long the VM is allowed to execute. Process 400 begins subsequent to determining that the VMM timer is enabled and identifying a VMM timer value configured by the VMM, as illustrated in FIG. 2.

Initially, processing logic stores the offset value configured by the VMM (e.g., as stored in a preemption timer field in the VMCS) as a countdown value in a register (processing block 402). Next, processing logic transitions control to the VM (processing block 403). After transitioning control to the VM, processing logic begins decrementing the countdown value at the rate proportional to the increments of the clock (e.g., every N ticks of the clock) (processing block 404). After each decrement, processing logic checks whether the countdown value has reached 0 (processing box 406). Note that the decrementing of the countdown value may result in the value becoming negative. In this case, in an embodiment, the value is not allowed to be made lower than 0 (i.e., the decrementing stops at 0). Alternatively, the value may be allowed to be made lower than 0, in which case the determination at processing block 406 would be made determined by the value reaching or crossing 0. If the countdown value has reached (has matched or crossed) 0, processing logic issues an internal event and generates a VM exit, indicating that the source of the VM exit is the VMM timer (processing block 412). In one embodiment, once the determination in processing block 406 is positive, a signal is generated that is recognized (e.g., by microcode or a hardware component) at the end of the currently executing instruction. The recognition of this signal indicates that a VM exit due to the VMM timer may be required. This requirement is then prioritized (e.g., by microcode) with other VM exit sources, and the appropriate VM exit to the VMM is generated as discussed above.

If the countdown value has not yet reached 0, processing logic checks for a non-VMM timer event associated with a VM exit (processing box 408). If such event occurs, processing logic stores the current countdown value to the VMCS (processing block 410) and generates a VM exit, indicating the source of this VM exit (processing block 414). Otherwise, processing logic returns to processing block 404.

In an embodiment, the storing of the countdown timer value in processing block 410 may be controlled by a store VMM timer control value stored in the VMCS. If the store VMM timer control is set to an enabled value, then the value of the countdown timer is stored (e.g., to the VMCS) as part of VM exit processing. In an embodiment, if the store VMM timer control is not set to an enabled value, a value of 0 is stored to the offset value configured by the VMM (e.g., to a field in the VMCS). In another embodiment, if the store VMM timer control is not set to an enabled value the offset value configured by the VMM is not modified.

Figure 5:
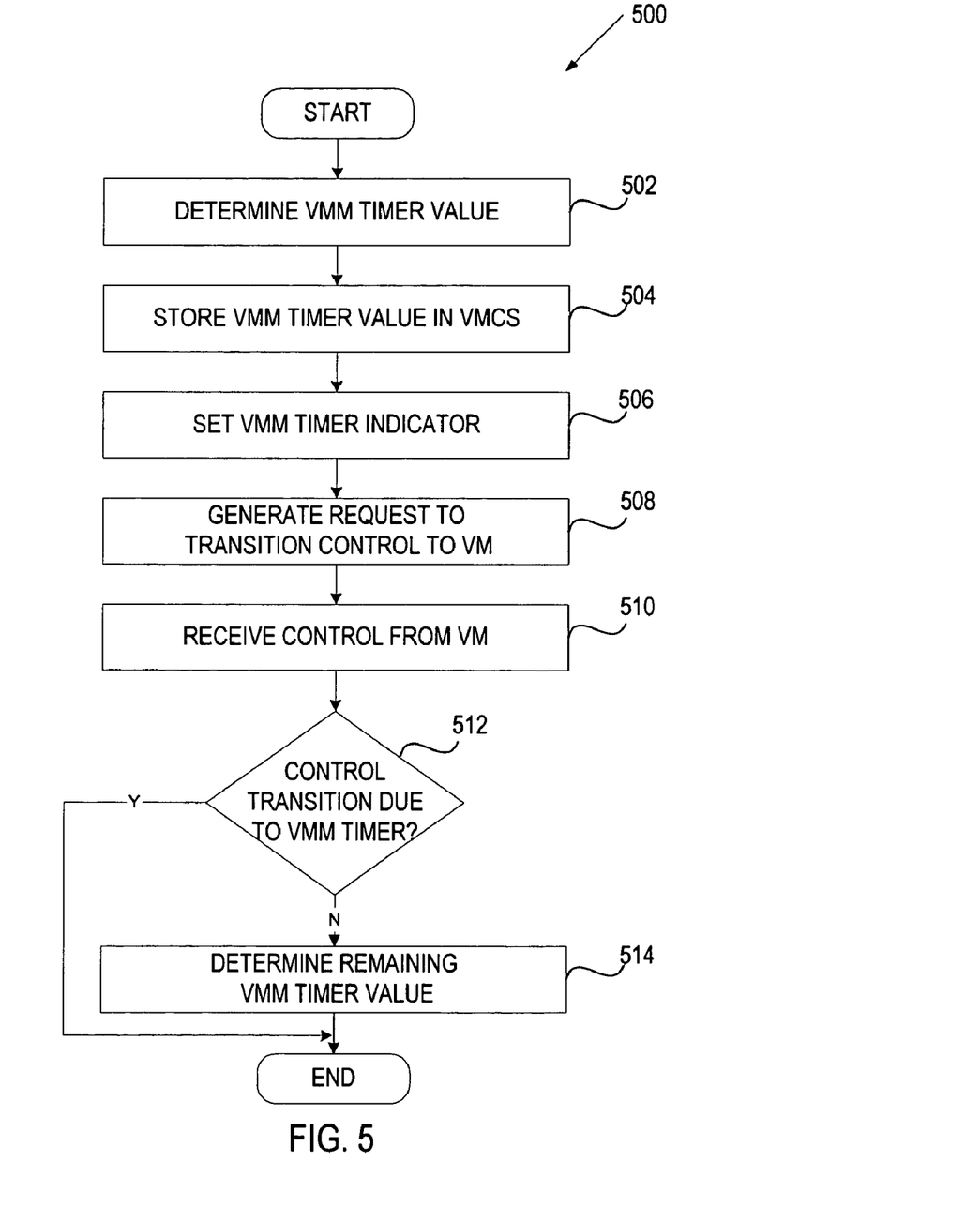
FIG. 5 is a flow diagram of one embodiment of a process for configuring a timer associated with a VMM.

FIG. 5 is a flow diagram of one embodiment of a process 500 for configuring a timer associated with a VMM. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 500 is performed by a timer configuration module 126 of FIG. 1.

Referring to FIG. 5, process 500 begins with processing logic determining a VMM timer value (processing block 502) and storing it in the VMCS (processing block 504). In one embodiment, the VMM timer value specifies the time at which control should be returned to the VMM. Examples of calculating the VMM timer value are provided below.

Next, processing logic sets a VMM timer indicator to an enabling value (processing block 506) and issues a request to transition control to the VM (a VM entry request) (processing logic 508).

Subsequently, when a VM exit from the VM is generated, processing logic receives control back (processing block 510) and determines whether control was returned due to the VMM timer (processing block 512). If so, processing logic may perform a desired operation and then generate a VM entry to the same VM or a different VM.

Prior to generating the VM entry, processing logic may need to update the VM timer indicator and/or the VMM timer value (processing block 514). In one embodiment, the remaining time was saved to the VMCS prior to the VM exit (as discussed above with respect to FIG. 4). In another embodiment, the remaining time is calculated by processing logic upon receiving control from the VM.

In an embodiment, the VMM timer is used to determine a scheduling quantum for a VM. When a VM is scheduled to execute, it is assigned a quantum value by the VMM. This value is initially used for the VMM timer value. Upon transition to the VM, processing logic will utilize the countdown VMM timer value as described with respect to FIG. 4. Before control is transitioned to the VMM, processing logic determines how much time was left in the time quantum allocated to the VM. In one embodiment, processing logic calculates the remaining time by reading the time value of the timing source prior to transitioning control to the VM and when receiving control from the VM. The difference of these two values indicates how long the VM was executing. This value is then subtracted from the time allocated to the VM. When the remaining time value reaches 0, the VMs scheduling quantum is consumed, and the VMM may then schedule a different VM to execute.

In one embodiment, the VMM timer value is used to limit the maximum time that may be spent in the VM. An offset value (i.e., a time interval specifying how long the VM is allowed to execute) is added to the value of the timing source read by the VMM at the time of calculation. This value is used as the VMM timer value. Upon transition to the VM, processing logic will utilize this value as described with respect to FIG. 3. This same value is used each time control is transitioned to the VM. In this embodiment, the VMM timer acts as a watchdog timer, limiting the longest execution time in the VM, in the absence of other VM exit sources. Note that in an embodiment, a countdown timer (as described with respect to FIG. 4) may also be utilized to realize a watchdog timer mechanism.

Thus, a method and apparatus for providing support for a timer associated with a VMM have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving a request for a virtual machine (VM) entry, the VM entry request including a request for transitioning control from a virtual machine monitor (VMM) to a VM, the VMM having a timer configuration module including a VMM timer indicator;
   determining whether the VMM timer indicator is set to an enabling value indicating the timer configuration module is enabled to, if necessary, gain control back from the VM during an operation at the VM;
   if the VMM timer indicator is set to an enabling value, identifying a VMM timer value configured by the VMM prior to receiving the VM entry request, the VMM timer value representing a specific time at which the VMM is to receive the control back from the VM, and enabling the VMM timer using the VMM timer value, and transitioning control to the VM;

if the VMM timer indicator is not set to an enabling value, transitioning control to the VM;

executing a VM exit by returning the control back to the VMM from the VM in response to an event relating to the VM exit occurring at the VM.

2. The computer-implemented method of claim 1, further comprising storing the VMM timer value at a virtual machine control structure (VMCS).

3. The computer-implemented method of claim 1, further comprising:

periodically comparing a current value of the timing source with the VMM timer value after each cycle executed by the VM; and returning the control back to the VMM from the VM when the current value reaches the VMM timer value.

4. The method of claim 1, further comprising:

disabling the VMM timer upon the occurrence of a VM exit event.

5. The method of claim 1, further comprising:

indicating the VM exit was caused by the VMM timer when the VM exit event is a VMM timer event.

6. A machine-readable non-transitory storage medium comprising instructions which, when executed, cause a machine to:

receive a request for a virtual machine (VM) entry, the VM entry request including a request for transitioning control from a virtual machine monitor (VMM) to a VM, the VMM having a timer configuration module including a VMM timer indicator;

determine whether the VMM timer indicator is set to an enabling value indicating the timer configuration module is enabled to, if necessary, gain control back from the VM during an operation at the VM;

if the VMM timer indicator is set to an enabling value, identify a VMM timer value configured by the VMM prior to receiving the VM entry request, the VMM timer value representing a specific time at which the VMM is to receive the control back from the VM, and enable the VMM timer using the VMM timer value, and transitioning control to the VM;

if the VMM timer indicator is not set to an enabling value, transition control to the VM;

execute a VM exit by returning the control back to the VMM from the VM in response to an event relating to the VM exit occurring at the VM.

7. The machine-readable storage medium of claim 6, wherein the instructions that when executed, further cause the machine to store the VMM timer value at a virtual machine control structure (VMCS).

8. The machine-readable storage medium of claim 6, wherein the instructions that when executed, further cause the machine to:

periodically compare a current value of the timing source with the VMM timer value after each cycle executed by the VM; and return the control back to the VMM from the VM when the current value reaches the VMM timer value.

9. The machine-readable storage medium of claim 6, wherein the instructions further comprise instructions which, when executed cause a machine to:

disable the VMM timer upon the occurrence of a VM exit event.

10. The machine-readable storage medium of claim 6, wherein the instructions further comprise instructions which, when executed cause a machine to:

indicate the VM exit was caused by the VMM timer when the VM exit event is a VMM timer event.

11. A computer system comprising:

a non-transitory storage medium having a virtual machine control structure (VMCS); and a processor coupled to the storage medium, the processor having a virtual machine memory (VMM) timer support logic and in communication with a VMM having a timer configuration module, the processor further in communication with a virtual machine (VM) and, during operation of the VM and the VMM, the processor to:

receive a request for a virtual machine (VM) entry, the VM entry request including a request for transitioning control from a virtual machine monitor (VMM) to a VM, the VMM having a timer configuration module including a VMM timer indicator;

determine whether the VMM timer indicator is set to an enabling value indicating the timer configuration module is enabled to, if necessary, gain control back from the VM during an operation at the VM;

if the VMM timer indicator is set to an enabling value, identify a VMM timer value configured by the VMM prior to receiving the VM entry request, the VMM timer value representing a specific time at which the VMM is to receive the control back from the VM, and enable the VMM timer using the VMM timer value, and transitioning control to the VM;

if the VMM timer indicator is not set to an enabling value, transition control to the VM;

execute a VM exit by returning the control back to the VMM from the VM in response to an event relating to the VM exit occurring at the VM.

12. The computer system of claim 11, wherein the processor is further to store the VMM timer value at the virtual machine control structure (VMCS).

13. The computer system of claim 11, wherein the processor is further to:

periodically compare a current value of the timing source with the VMM timer value after each cycle executed by the VM; and return the control back to the VMM from the VM when the current value reaches the VMM timer value.

14. The computer system of claim 11, wherein the processor further to:

disable the VMM timer upon the occurrence of a VM exit event.

15. The computer system of claim 11, wherein the processor further to:

indicate the VM exit was caused by the VMM timer when the VM exit event is a VMM timer event.

16. An apparatus comprising:

a processor, during operation of a virtual machine (VM) and a virtual machine monitor (VMM), to:

receive a request for a virtual machine (VM) entry, the VM entry request including a request for transitioning control from a virtual machine monitor (VMM) to a VM, the VMM having a timer configuration module including a VMM timer indicator;

determine whether the VMM timer indicator is set to an enabling value indicating the timer configuration module is enabled to, if necessary, gain control back from the VM during an operation at the VM;

if the VMM timer indicator is set to an enabling value,
identify a VMM timer value configured by the VMM prior to receiving the VM entry request, the VMM timer value representing a specific time at which the VMM is to receive the control back from the VM, and enable the VMM timer using the VMM timer value, and transitioning control to the VM;

if the VMM timer indicator is not set to an enabling value, transition control to the VM;

execute a VM exit by returning the control back to the VMM from the VM in response to an event relating to the VM exit occurring at the VM.

17. The apparatus of claim 16, wherein the processor is further to store the VMM timer value at a virtual machine control structure (VMCS).

18. The apparatus of claim 16, wherein the processor is further to:

periodically compare a current value of the timing source with the VMM timer value after each cycle executed by the VM; and return the control back to the VMM from the VM when the current value reaches the VMM timer value.

* * * * *